(Model.)
B. GOODYEAR.
Crock Bail or Handle.
No. 231,791.            Patented Aug. 31, 1880.
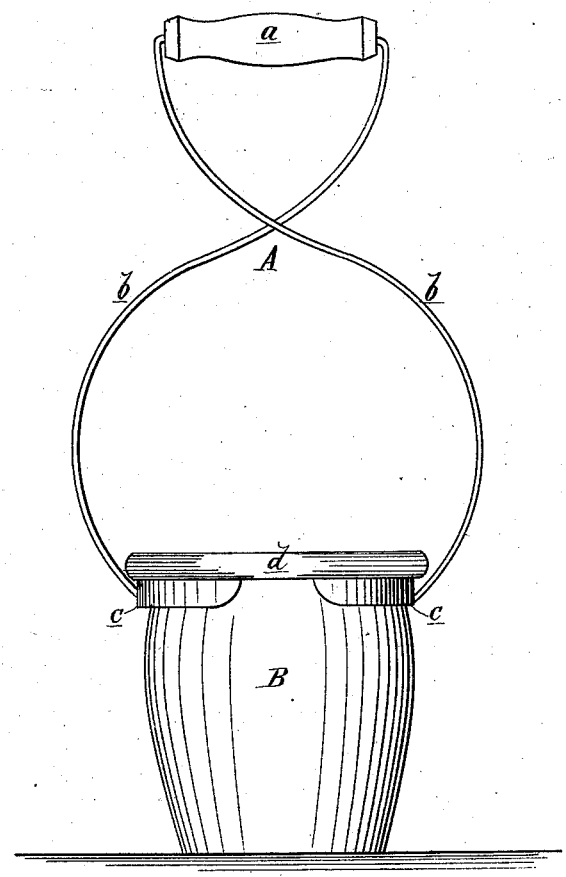
WITNESSES:
Henry N. Miller
C. Sedgwick
INVENTOR:
B. Goodyear
BY
ATTORNEYS.

UNITED STATES PATENT OFFICE.

BENJAMIN GOODYEAR, OF CARLISLE, PENNSYLVANIA.

CROCK BAIL OR HANDLE.

SPECIFICATION forming part of Letters Patent No. 231,791, dated August 31, 1880.

Application filed June 15, 1880. (Model.)

*To all whom it may concern:*

Be it known that I, BENJAMIN GOODYEAR, of Carlisle, in the county of Cumberland and State of Pennsylvania, have invented a new and Improved Crock Bail or Handle, of which the following is a specification.

The object of this invention is to provide a simple and inexpensive detachable bail or handle for crocks that may instantly be applied or removed therefrom.

The invention consists, essentially, of a stout wire bail bent in the shape of a figure 8, and having a curved clamp on each end, so that the said clamps shall be in a horizontal plane and with their concave faces opposite each other, in order that when said clamps are applied to the opposite sides of a crock or other object they will grasp said crock or other object with a pressure dependent upon the upward pull exerted on the upper loop, which forms the handle of the device.

The drawing represents a front elevation of the device applied to a crock.

In the drawing, A represents the crock bail or handle, provided with a horizontal handle, $a$, doubly curved and crossed legs $b\ b$, and on the ends of the legs $b\ b$ with inwardly-curved clamps $c\ c$, which clamps $c\ c$ may consist of plates of metal, as herein shown, or may be formed by bending the ends of the wire or rod of which the crock bail or handle is composed back on themselves to form loops that may be afterward compressed and bent in curves to fit upon the sides of the crock B; or, instead of the plain clamps $c\ c$ herein shown, hooks may be formed on or attached to the ends of the legs $b\ b$ with which to grasp the crock B or other object.

The device is especially designed for application to crocks devoid of handles, the clamps $c\ c$ being applied to the crock immediately beneath the rim $d$ thereof, so that they shall not slip therefrom.

A crock bail or handle of this construction and of a given size can be applied to crocks of different sizes.

The legs $b\ b$ being spread apart, the clamps $c\ c$ are applied below the rim $d$ of the crock, and as the said crock B and crock bail or handle A are raised by the handle $a$ the said clamps $c\ c$ grasp the said crock B with a lateral pressure proportionate to the weight of said crock B, so that said crock B can be carried about without risk of becoming detached.

Having thus described my invention, what I claim as new, and desire to secure by Letters Patent, is—

As an improved article of manufacture, a crock handle or bail constructed substantially as herein shown and described, consisting of the crossed bail A, provided with handle $a$ and inwardly-curved clamps $c\ c$, as set forth.

BENJAMIN GOODYEAR.

Witnesses:
GEORGE W. RAHN,
D. C. TAYLOR.